July 20, 1948.　　　P. KOPPERMAN　　　2,445,485
CORRUGATION LIMIT STOPS
Filed Jan. 10, 1946　　　　　　　　　　2 Sheets-Sheet 1

INVENTOR
Paul Kopperman
BY
Harry Langsam
ATTORNEY

July 20, 1948. P. KOPPERMAN 2,445,485
CORRUGATION LIMIT STOPS
2 Sheets-Sheet 2
Filed Jan. 10, 1946

INVENTOR
Paul Kopperman
BY
Harry Langsam
ATTORNEY

Patented July 20, 1948

2,445,485

UNITED STATES PATENT OFFICE 2,445,485

CORRUGATION LIMIT STOP

Paul Kopperman, Philadelphia, Pa.

Application January 10, 1946, Serial No. 640,204

1 Claim. (Cl. 285—90)

My invention relates to expansion joints, and relates particularly to means for limiting the expansion of each ring and to means for keeping the rings in alignment.

Heretofore, expansion joints have been used wherein limit stops have been used but the limit stops at times have broken when subjected to the shifting or transverse movement of the parts comprising the joints because of the unequal expansion of portions of the joints.

It, therefore, is an object of my invention to provide an expansion joint wherein a flanged expansion joint has stops for limiting the expansion and contraction of the rings.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawing in which:

Fig. 3 is a front view of one of the channel aligning bars.

Fig. 4 is a sectional view taken along the line 4—4 of Fig. 3.

Figure 1:
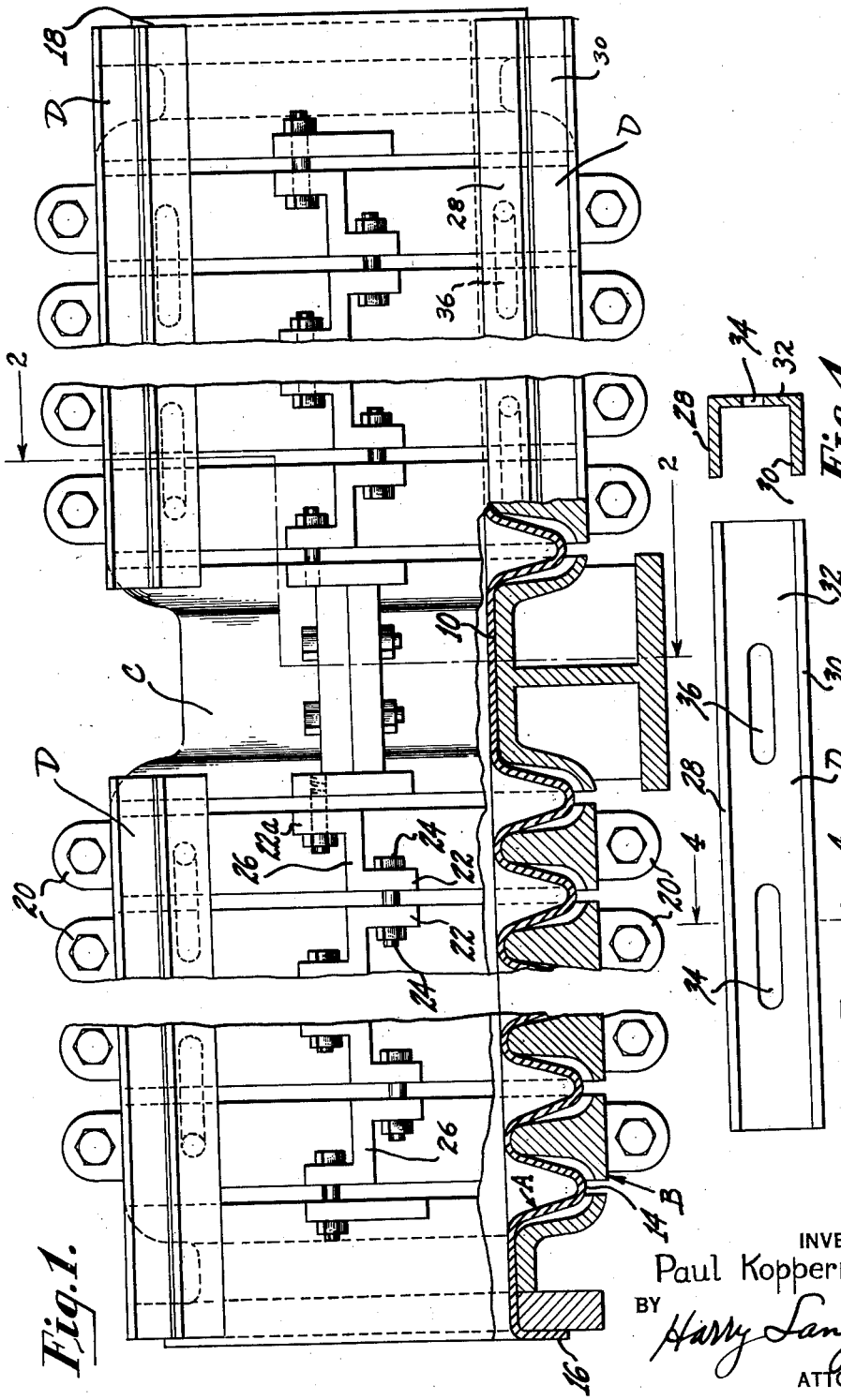
Fig. 1 is a fragmentary side view of a double expansion joint with a center anchor base.
Figure 2:
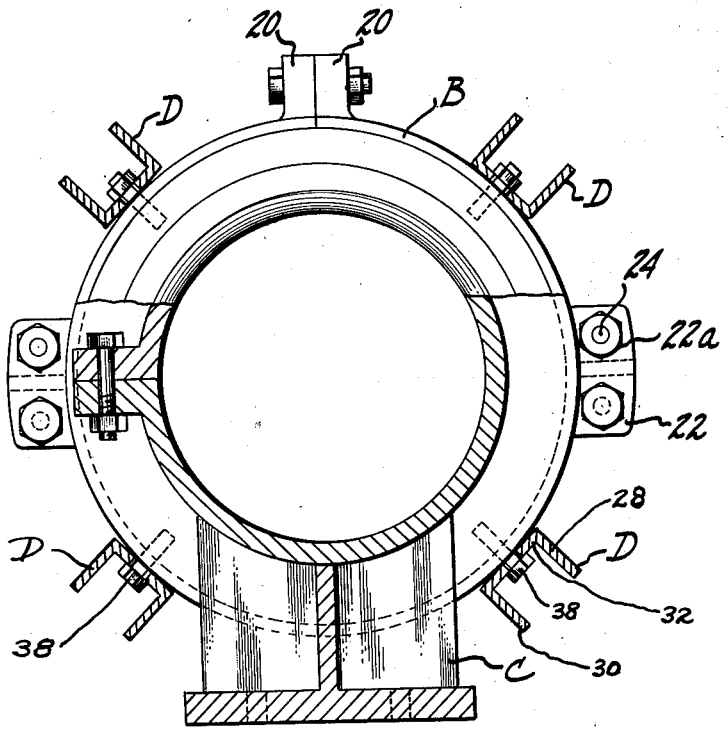
Fig. 2 is a sectional view taken along the line 2—2 of Fig. 1.

Referring now in detail to the drawings, I show a double expansion joint with a center anchor base which is adapted to be coupled to two rigid lengths of conduit or pipe whereby heated gases, vapors, or liquids may be carried through the line; furthermore, the expansion joints connected to the rigid sections of the pipe line enable the rigid pipe line to expand and contract.

The expansion joint includes a copper corrugated member, generally designated as A, a plurality of equalizing rings, generally designated as B. The center of the joint is carried by an anchor base, generally designated as C, which base is adapted to be rigidly fastened in position so that each expansion joint connected to the base may expand.

The double expansion joint A has a cylindrical central portion 10 resting upon and within the cylindical portion 12 of the anchor base C. From each side of the cylindrical portion 10 are a plurality of corrugations 14 which terminate in flanges 16 and 18.

Within the trough of the corrugations 14 is one of the equalizing rings B, which are split rings, so that they may be easily placed in position. The rings B are bolted together by bolts which pass through the radially extending flanges 20. Also, integrally formed with each ring B is a radially extending flange 22 which has a bolt 24 through the flange 22, which bolt limits the expansion of the corrugations 14. The width of the rings B is sufficiently wide to limit and equalize the compression of the corrugations when the adjacent side edges of the rings abut one another.

The transverse flange 22 has one end joined to a longitudinally extending flange 26, and to the other end of the flange 26 is another transverse flange 22a extending on the other side of the flange 26. This Z line flange, comprised of the flanges 22, 26, 22a, is integrally formed with the ring B and adds strength to resist the expansion of the rings B, B.

A steel channel aligning bar, generally designated as D, has a pair of flanges 28, 30 joined by base portion 32. Within the base 32 of the channel D are a plurality of longitudinally extending slots 34, 36, which slots enable the channels to slide within bolts or studs 38 affixed or screwed into the rings B. The channel D keeps the rings in alignment, thereby preventing distortion.

The expansion joint also may have a telescopic pair of tubes within which tubes the fluid may pass.

Although my invention has been described in considerable detail, such description is intended as being illustrative rather than limiting, since the invention may be variously embodied, and the scope of the invention is to be determined as claimed.

I claim as my invention:

In a corrugated expansion joint, a plurality of rings, one ring being located in the trough of each corrugation, a Z-shaped flange integrally formed with each ring, a bolt extending between adjacent Z-shaped flanges to limit the expansion of said rings, and a single channel having longitudinally extending slots therein whereby radially extending bolts in said rings will keep said rings in alignment.

PAUL KOPPERMAN.

REFERENCES CITED

The following references are of record in the file of this patent:

UNITED STATES PATENTS

| Number | Name | Date |
| --- | --- | --- |
| 801,860 | Fales et al. | Oct. 17, 1905 |
| 1,052,709 | Badger | Feb. 11, 1913 |
| 1,527,667 | Brocklebank | Feb. 24, 1925 |
| 1,835,298 | Greene | Dec. 8, 1931 |